5/8/84 OR 4,447,131

United States Patent [19]

Soma

[11] 4,447,131

[45] May 8, 1984

[54] LIQUID CRYSTAL DRIVING APPARATUS

[75] Inventor: Tsunenori Soma, Kawasaki, Japan

[73] Assignee: Canon Kabushiki Kaisha, Tokyo, Japan

[21] Appl. No.: 352,264

[22] Filed: Feb. 25, 1982

[30] Foreign Application Priority Data

Mar. 3, 1981 [JP] Japan .................................. 56-29425

[51] Int. Cl.[3] .................................................. G02F 1/13

[52] U.S. Cl. ..................................... 350/333; 340/784; 340/802

[58] Field of Search ................ 350/332, 333; 340/784, 340/802

[56] References Cited

U.S. PATENT DOCUMENTS

| | | | |
|---|---|---|---|
| 3,848,247 | 11/1974 | Sherr | 350/333 X |
| 4,119,367 | 10/1978 | Raynes et al. | 350/333 |
| 4,231,035 | 10/1980 | van Doorn et al. | 340/784 |
| 4,308,534 | 12/1981 | Yamamoto | 350/333 X |
| 4,342,994 | 8/1982 | Lorteije | 340/784 |
| 4,392,131 | 7/1983 | Walter | 340/789 X |

OTHER PUBLICATIONS

Alt, P. M., "Multiplexing for Large Matrix, Dynamic Scattering, Liquid Crystal Cells," *IBM Technical Disclosure Bull.*, vol. 16, No. 5, (Oct. 1973), pp. 1456–1457.

*Primary Examiner*—John K. Corbin
*Assistant Examiner*—Richard F. Gallivan
*Attorney, Agent, or Firm*—Fitzpatrick, Cella, Harper & Scinto

[57] ABSTRACT

A liquid crystal driving apparatus comprises a plural number of first signal lines arranged on the front surface of a liquid crystal panel, a plural number of second signal lines arranged on the back surface of the liquid crystal panel in the direction intersecting the first signal lines at right angles, third signal lines arranged between the first signal lines, fourth signal lines arranged between the second signal lines, and a time division driving signal generator and a selection driving signal generator. The time division driving signal generator supplies time division driving signals to the first and fourth signal lines. In synchronism with the time division driving signals generated by the time division driving signal generator, the selection driving signal generator supplies selection driving signals to the second and third signal lines.

5 Claims, 10 Drawing Figures

LIQUID CRYSTAL DRIVING APPARATUS

BACKGROUND OF THE INVENTION

1. Field of the Invention

The present invention relates to a liquid crystal driving apparatus and is more particularly directed to the development of a novel arrangement of a liquid crystal driver with which the number of liquid crystal dots available for diplay can be increased in a display panel composed of a liquid crystal dot matrix.

2. Description of the Prior Art

A liquid crystal dot matrix display is well known in the art. For example, a square display panel is formed of a liquid crystal dot matrix. According to the prior art, such a square display panel is formed and driven in the following manner:

A first signal line pattern and a second signal line pattern are formed with a liquid crystal being sandwiched in between the two signal line patterns. For example, the first signal line pattern is formed on the front surface of the liquid crystal by arranging a plurality of signal lines at regular intervals in one direction, for example, lengthwise. The second signal line pattern is formed on the back surface of the liquid crystal by arranging a plurality of signal lines at regular intervals in the direction intersecting the first signal lines at right angles, for example, widthwise. Liquid crystal dots are formed at the points where the first signal line pattern on the front surface and the second signal line pattern on the back surface intersect each other.

To selectively drive the liquid crystal dots for display, time division driving signals and selection driving signals are used. To the signal lines on one of the two surfaces there are applied time division driving signals of a definite waveform regardless of the display data to be displayed on the display panel. Applied to the signal lines on the other surface are selection driving signals corresponding to the data to be displayed. The selection driving signals are supplied in synchrony with the time division driving signals. The liquid crystal dots are driven for display by the potential difference between the two signals.

FIG. 1 shows an example of the above mentioned type of square liquid crystal display panel.

The example shown in FIG. 1 is a square liquid crystal display panel formed by an 8 (lengthwise)×8 (widthwise) dot matrix which is driven for display by a liquid crystal display driving circuit having a driving capacity of ¼ duty.

In FIG. 1, the signal line pattern formed on the front surface of liquid crystal is indicated by solid lines and the signal line pattern on the back surface by broken lines. Marks "○" indicate intersections of the front pattern and the back pattern where liquid crystal dots are formed.

The back pattern includes eight signal lines, SY1 through SY8, extending in the direction of Y. Time division signals TS1–TS4 are supplied to the signal lines SY1–SY4 from a liquid crystal display driving circuit (not shown). The square area enclosed by a chain-dotted line and indicated by P is the display screen area of the panel. At the outside of the display screen area P, the signal lines SY1 and SY5, SY2 and SY6, SY3 and SY7, SY4 and SY8 are connected by signal lines S1, S2, S3 and S4 respectively. Therefore, signals TS1–TS4 are applied also to the signal lines SY5–SY8 through liner S1–S4.

The front pattern includes sixteen signal lines, SX1 through SX16, extending in the direction of X. Selection driving signals SS1–SS16 are supplied to these signal lines SX1–SX16 from the liquid crystal display driving circuit.

The manner of driving of the above square liquid crystal display panel will be described by way of example by reffering to the signal waveforms shown in FIG. 2.

FIG. 2A shows exemplary waveforms of time division driving signals TS1–TS4 according to the four level equal division method. As an example, description is made of such a case where only two liquid crystal dots D (1, 1) and D (2, 2) are selected to be lit by means of the signals TS1–TS4. As seen in FIG. 1, the liquid crystal dot D (1, 1) is at the intersection of X1-row and Y1-line on the display panel. Namely, it is a liquid crystal dot formed by the signal lines SX1 and SY1 with liquid crystal therebetween. The liquid crystal dot D (2, 2) is at the intersection of X2-row and Y2-line and formed by signal lines SX2 and SY2 with liquid crystal therebetween.

FIG. 2B shows selection driving signals SS1 and SS2 used to select and light the liquid crystal dots D (1, 1) and D (2, 2). The liquid crystal dot lights only when the potential difference ΔV between the signal line on the front surface of the liquid crystal and the signal line on the back surface thereof reaches a determined value ΔVo.

FIG. 2C shows the waveforms of signals DS1, DS2 and DS3 formed by the potential difference between signal lines TS1 and SS1 at the liquid crystal dot D (1, 1), by the potential difference between signal lines TS2 and SS2 at the liquid crystal dot D (2, 2) and by the potential difference between signal lines TS2 and SS1 at D (2, 1) where X1-row and Y2-line intersect each other. The potential differences at D (1, 1) and at D (2, 2) are sufficiently large enough to reach the dot lighting potential difference ΔVo. But, at the dot D (2, 1), the potential difference ΔV does not reach the lighting potential difference ΔVo. Therefore, only the liquid crystal dots D (1, 1) and D (2, 2) light on and the dot D (2, 1) can not light on. In this manner, the liquid crystal dots are driven for display.

When the above example of a liquid crystal display panel is driven for display with a driving capacity of ¼ duty in the manner described above, there are a limited number of dots which can be driven for display. For such a liquid crystal display panel having a driving capacity of ¼ duty, the number of liquid crystal dots which can be selected for display by selection driving signals is limited to four. The maximum number of liquid crystal dots which can be driven for display with respect to direction X for selection driving is only eight as seen from FIG. 1A. The reason for this is that in order to drive more than eight liquid crystal dots for display in the selection driving direction (X-direction) it is necessary to supply one more kind of selection driving signal to every row on the panel in the selection driving direction. In the signal line patterns of the prior art, it has been impossible to provide such signal lines for supplying one more selection driving signal.

For example, if four dots are added to the display panel having a driving capacity of ¼ duty in the selection driving direction (X-direction) and twelve dots in total are arranged in the direction of X as shown in FIG. 1B, then additional signal lines should be provided to supply the necessary selection driving signals for selectively driving the added four dots (see area (A) in FIG. 1B). Wiring of such additional signal lines is a difficult problem in this case. On might think that these additional signal lines can be laid making use of the space between. However, the space between dots is predetermined by certain factors. Among these factors is the requirement that the space should be sufficiently large enough to prevent two neighbouring dots from interferring with each other. Therefore, if an additional signal line is laid passing through the space between dots, then dots around the added signal line may be affected by the selection driving signal supplied through the signal line. for example, if an additional signal line J is laid between two lines Y8 and Y9 to supply a selection driving signal to dots D (5, 5)–D (8, 5) in X5-row as shown in FIG. 1B, then dots near the signal line J such as dots D (9, 6) and D (9, 7) may be affected by the signal transmitted through the signal line J. As another example, if a signal line K is additionally laid between two rows X4 and X5 as shown also in FIG. 1B, then the signal line K intersects the signal lines SY1–SY4 laid on the back surface of the liquid crystal and undesirable liquid crystal dots are formed at these intersections. In this case, not four but eight liquid crystal dots will be driven by one selection driving signal.

As can be readily understood from the foregoing, the signal line patterns according to the prior art have a particular limitation in the number of dots. Even if the number of dots is increased by additionally providing several dots such as D (5, 5)–D (8, 5) in a conventional liquid crystal display panel, it is impossible to suitably supply the necessary selection driving signal to those dots.

In case of the conventional signal line patterns, the number of liquid crystal dots which can be driven for display in the selection driving direction is determined by the driving duty of the liquid crystal display driving circuit then used. Accordingly, when a square display panel is to be made, the size of liquid crystal dot matrix, i.e., the number of dots available for display, is limited by the number of dots which can be driven for display in the selection driving direction (X-direction). For instance, in case of the square display panel having a driving capacity of ⅛ duty shown in FIG. 1, the number of dots in the selection driving direction (X-direction) is eight at maximum. Therefore, the number of dots in the time division driving direction (Y-direction) is determined directly by it to also be a maximum of eight. consequently, the maximum number of dots available for display is limited to 8×8 dots in total. It was impossible to form a square display panel comprising dots a matrix of larger than 8×8 according to the prior art.

SUMMARY OF THE INVENTION

Accordingly, it is an object of the invention to provide a liquid crystal driving apparatus which makes it possible to drive a square display panel formed of a square liquid crystal dot matrix containing a larger number of dots than that in the prior art ones.

It is another object of the invention to provide a liquid crystal driving apparatus which makes it possible to drive a square liquid crystal display panel by using a signal line pattern formed differently from the prior art and in a different manner from the prior art.

In the prior art display panel, liquid crystal is sandwiched in between two surfaces and liquid crystal dots are driven for display by supplying a time division driving signal to one of the two surfaces and a selection driving signal to the other surface in the direction perpendicular to the direction of time division driving signal. According to the present invention, the signal line pattern is formed in such manner that a selection driving signal can also be supplied to the surface to which the time division driving signal is supplied and a time division driving signal can also be supplied to the surface to which the selection driving signal is applied. With such a novel arrangement of the signal line pattern according to the invention it becomes possible to drive liquid crystal dots for display also at the intersections of those signal lines through which such time division driving signal and selection driving signal are supplied.

It is a further object of the invention to provide a liquid crystal driving apparatus with which, when a square liquid crystal display panel is driven for display, a larger number of dots can be driven for display as compared with the prior art displays without changing the duty and, therefore, which is useful for graphic display and other elaborate displays.

Other and further objects, features and advantages of the invention will appear more fully from the following description of preferred embodiments with reference to the accompanying drawings.

DETAILED DESCRIPTION OF PREFERRED EMBODIMENTS

Figure 1A:
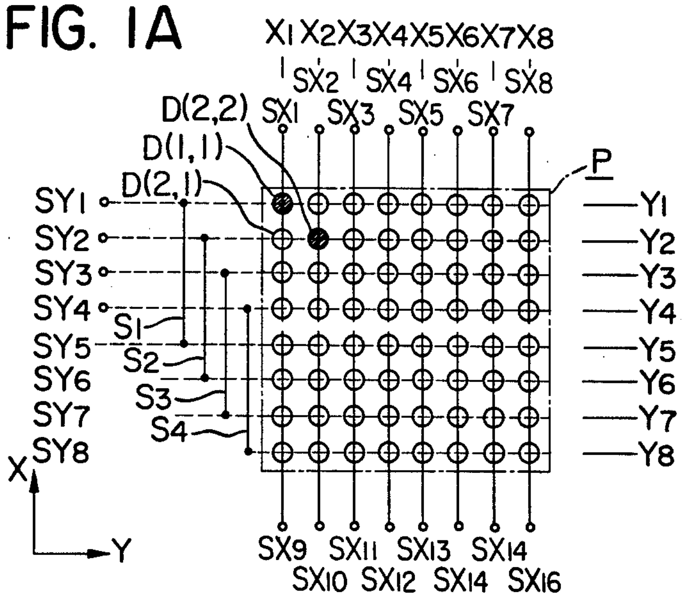
FIGS. 1A and 1B are diagrams showing a signal line pattern on a display panel formed according to the conventional method of a liquid crystal dot matrix display.
Figure 1B:
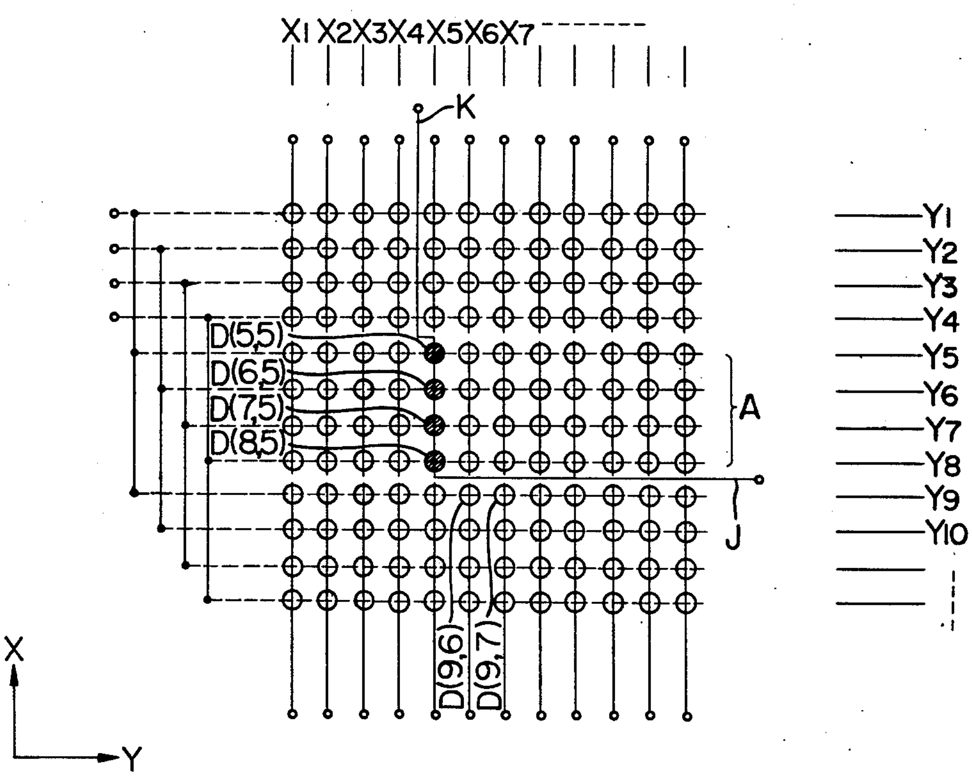

The present invention will be described further in detail with reference to FIGS. 3 to 5 wherein like characters to FIG. 1 represent the same or corresponding elements and dot positions.

Figure 3:
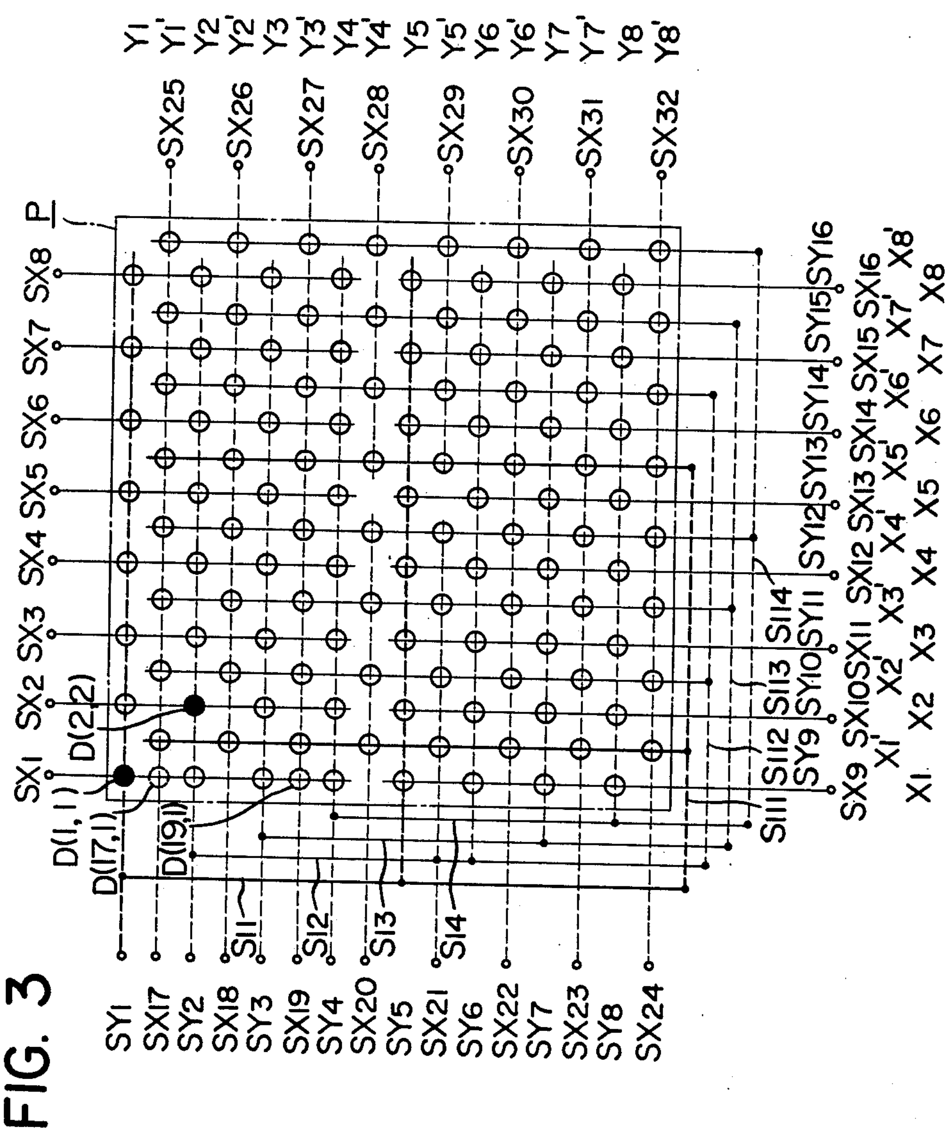
FIG. 3 is a diagram showing a signal line pattern on a display panel formed in accordance with the present invention.

FIG. 3 shows a square display panel of ⅛ duty in driving capacity as an embodiment of the liquid crystal driving apparatus according to the present invention. The area designated by P is the display screen part of the display panel. Solid lines indicate signal lines arranged on the front surface of liquid crystal and broken lines indicate signal lines arranged on the back surface thereof. Liquid crystal is located between the front surface and the back surface.

On the back surface there are arranged signal lines SY1–SY8 in eight lines Y1–Y8 and further signal lines SX17–SX32 in eight lines Y1′–Y8′ between the lines Y1–Y8.

On the front surface there are arranged signal lines SX1–SX16 in eight rows X1–X8 and further signal lines SY9–SY16 in eight rows X1′–X8′ interposed between the rows X1–X8.

In addition, the front surface has signal lines S11–S14 arranged on an area other than the display screen area P. Similarly, the back surface has signal lines S111–S114 arranged on an area other than the display screen area P. The signal line S11 on the front surface is connected with the signal lines SY1, SY5, and S111 on the back surface at connection points marked by "·". The signal line S111 on the back surface is, on the other hand, connected with the signal lines SY9 and SY13 arranged on the surface. In a manner similar to that indicated above, signal lines SY2, SY6, SY10 and SY14 are connected each other by signal lines S12 and S112, signal lines SY3, SY7, SY11 and SY15 are connected each other by signal lines S13 and S113, and signal lines SY4, SY8, SY12 and SY16 are connected each other by signal lines S14 and S114.

In the signal line pattern thus formed on the front and back surfaces with liquid crystal being sandwiched in between the two surfaces, four kinds of time division driving signals TS1–TS4 are supplied to the signal lines SY1–SY4 respectively from a display driving circuit (not shown), and also selection driving signals SS1–SS32 are supplied to the signal lines SX1–SX32. The time division driving signal TS1 supplied to the signal line SY1 goes to signal line SY5 through signal line S11 and further to signal lines SY9 and SY13 through signal line S111. Similarly, signal TS2 is supplied to SY2 and goes to SY6, SY10 and SY14. Signal TS3 is supplied to SY3 and goes to SY7, SY11, SY15 and signal TS4 is supplied to SY4 and goes to SY8, SY12, SY16. Therefore, among the intersections of these signal lines SY1–SY16 and SX1–SX32 arranged on the front and back surfaces, those intersections to which the time division driving signals TS1–TS4 and selection driving signals SS1–SS32 are supplied (indicated by mark "○" in FIG. 3) can be driven for display. More particularly, in addition to an 8×8 liquid crystal dot matrix comprising eight lines Y1–Y8 and eight columns X1–X8, there can be driven for display a further 8×8 liquid crystal dot matric comprising eight lines Y1′–Y8′ and eight columuns X1′–X8′ interposed between the above lines and columuns. Thus, according to the invention, it is possible to form a display panel composed of an 8×8×2 dot matrix in total.

Comparing the signal line pattern of the invention with the conventional signal line pattern shown in FIG. 1A, it will be understood that the signal line pattern according to the invention has a line space that is twice as large as that in a conventional display thereby allowing the formation of an additional 8×8 liquid crystal dot matrix comprising eight lines Y1′–Y8′ and eight columuns X1′–X8′ making use of the broadened line space and that the front surface and the back surface with liquid crystal being sandwiched in therebetween are inverse and then rotated by 90° to the conventional one with respect to the arrangement of the signal line pattern.

Figure 4:
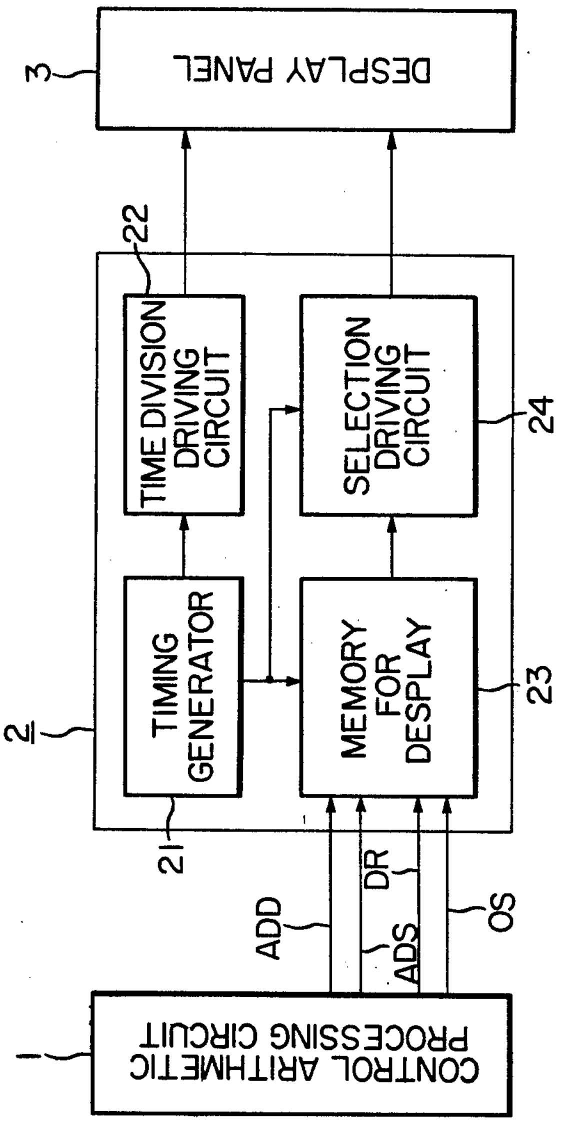
FIG. 4 is a block diagram showing a display driving circuit for driving the display panel shown in FIG. 3.

FIG. 4 shows an arrangement of the driving circuit useful for driving the above shown square liquid crystal display panel of the invention.

In FIG. 4, 1 is a central arithmetic processing unit, 2 is a display unit and 3 is the display panel shown in FIG. 3. The display unit 2 includes a timing generator 21, s time division driving circuit, a display memory 23 and a selection driving circuit 24. A ¼ duty timing signal is applied to the time division driving circuit 22, display memory 23 and selection driving circuit 24 from the timing generator 21. In response to the applied timing signal, the time division driving circuit 22 supplies four kinds of time division driving signals TS1–TS4 to the display panel 3. The display memory 23 includes a memory part having addresses AD1–AD32 corresponding to thirty two kinds of selection driving signals SS1–SS32. Under the control by the central arithmetic processing unit 1, these addresses AD1–AD32 are assigned for lighting data. The lighting data are supplied to and stored in the assigned addresses respectively. In response to the timing signal from the timing generator 21, the display memory 23 supplies the lighting data registered in addresses AD1–AD32 to the selection driving circuit 24. The selection driving circuit 24 is a selection driving signal generator which makes up the waveforms of selection driving signals SS1–SS32 from the lighting data supplied from the display memory 23. The selection driving signals SS1–SS32 are supplied to the display panel 3 from the selection driving circuit 24 in response to the timing signal applied to the circuit 24, that is to say, in synchrony with the time division driving signals TS1–TS4 from the time division driving circuit 22.

The manner of operation of the liquid crystal driving apparatus of the invention shown in FIG. 3 will be described hereinafter in connection with the case where liquid crystal dots D (1, 1) and D (2, 2) are lighted on for display on the display panel.

At first, an address assignment data ADD "1" is put into the address line ADD from the central arithmetic processing unit 1 and also an address setting data ADS is produced. Thereby, the address assignment data ADD "1" is introduced into the display memory 23 to set the address AD1. Subsequently, a lighting data TD "1000" is put out from the central arithmetic processing unit 1 into the data line DR. By a data setting signal DS produced from the central arithmetic processing unit, the lighting data TD "1000" is registered in the assigned address AD1 of the memory for display 23. This means that there is registered in the address AD1 such selection driving data the content of which is that in X1-row, dot D (1, 1) at which X1-row and Y1-line intersect each other, is to be lit and other dots D (2, 1), D (3, 1) and D (4, 1) at which X1-row intersects Y2–Y4 lines respectively, are to be off.

At the next step, in a similar manner to the above, an address AD2 in the display memory 23 is assigned by the central arithmetic processing unit 1 and a lighting data TD "0100" is registered in the assigned address AD2 through the data line DR. Therefore, in the address AD2 there is stored such selection driving data the content of which is that in X2-row only one dot D (2, 2) is to be lit and other dots at which X2-row intersects lines Y1, Y3 and Y4, are to be off.

As for the remaining addresses AD3–AD32, the above operation is repeated to register in these addresses a lighting data TD "0000" the content of which is that dots are all to be off.

Lighting data registered in the display memory 23 in this manner are then supplied to the selection driving circuit 24 based on the ¼ duty timing signals generated from the timing generator 21. With the first timing signal, lighting data of Y1-line (Y5, X1′, X5′) is at first selected from addresses AD1–AD32 and supplied to the selection driving circuit 24. Thus, the selection driving circuit 24 receives data "1" from address AD1 and data "0" from addresses AD2–AD32. From this lighting data of Y1-line (Y5, X1', X5') the selection driving circuit 24 makes up selection driving signals SS1–SS32. In this case, the selection driving signal SS1 is of the waveform shwon in FIG. 2B. At the same time and in synchrony with the time division driving signals TS1–TS4 issued from the time division driving circuit 22, driving signals SS1–SS32 are supplied to the selection driving signal lines SX1–SX32 of the display panel 3. That the change in voltage of the dot D (1, 1) occurred at this time is seen from the signal DS1 in FIG. 2C. As can be observed the voltage is sufficiently high enough to reach the lighting voltage ΔVo and therefore the dot D (1, 1) lights up. Other dots can not light up.

Figure 2A:
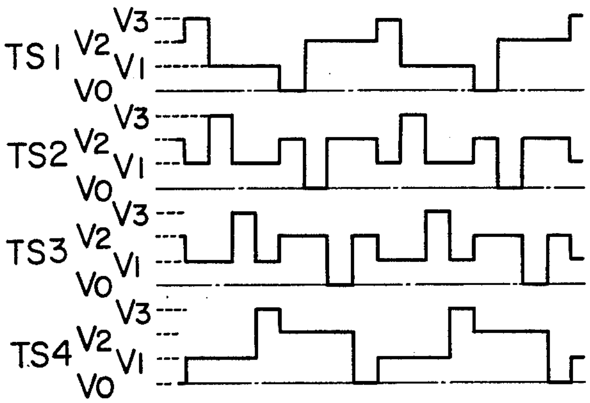
FIGS. 2A to 2C are waveform charts showing time division driving signal and selection driving signal used for driving the display panel shown in FIG. 1A and also their waveforms at the liquid crystal dots D (1, 1), D (2, 2) and D (2, 1) obtained when the driving signals are applied to the display panel.
Figure 2B:
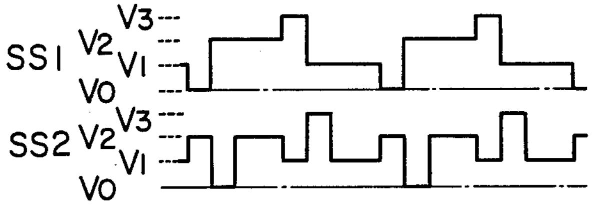
Figure 2C:
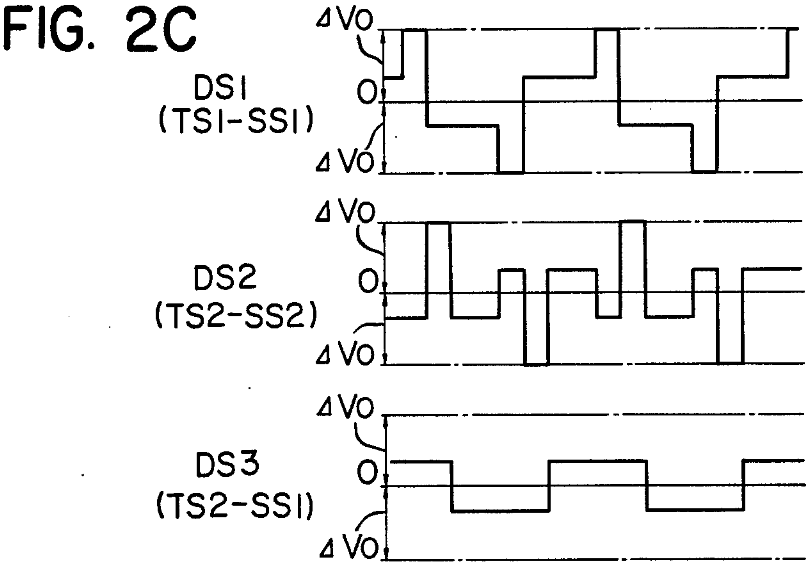

At the next timing, the lighting data of Y2-line (Y6, X2', X6') are supplied to the selection driving circuit 24 from the addresses AD1–AD32 in the same manner as above. In this case, the selection driving circuit 24 receives data "0" and "1" respectively from the addresses AD1 and AD2. From these lighting data the driving circuit makes up signals SS1–SS32. The waveform of the signal SS2 formed is shown in FIG. 2B. At the same time and in synchrony with the signals TS1–TS4, these signals SS1–SS32 are supplied to the signal lines SX1–SX32 of the display panel 3 respectively. That the change in voltage of the dot D (2, 2) occurred at this time is seen from the signal DS2 in FIG. 2C. Since the voltage is sufficiently high enough to reach the lighting voltage ΔVo, the dot D (2, 2) lights up. At this time, other dots can not light up. Similarly, at the third timing, lighting data of Y3-line (Y7, X3', X7') are supplied and at the fourth timing the lighting data of Y4-line (Y8, X4', X8') are supplied.

As previously mentioned, in the display panel of the invention shown in FIG. 3 the intersections at which liquid crystad dots can be driven for display are those marked by "○". At other intersections of the signal line pattern formed on the front surface and the back surface with liquid crystal being sandwiched therebetween, liquid crystal dots cannot be driven for display. As seen in FIG. 3, time division signal lines intersect each other and also selection signal lines intersect each other so as to form other intersections than those marked by "○". Two examples of such other intersections are indicated by broken circle mark "◌" in FIG. 3. At those other intersections there are formed also liquid crystal dots as a matter of course. Liquid crystal dots D (17, 1) and D (19, 1) in X1-row are examples thereof. However, those other liquid crystal dots never light up even if any waveforms of signals TS1–TS4, SS1–SS32 are applied thereto. The reason for this will be described hereinafter by way of example in connection with the liquid crystal dots D (17, 1) and D (19, 1).

Figure 5A:
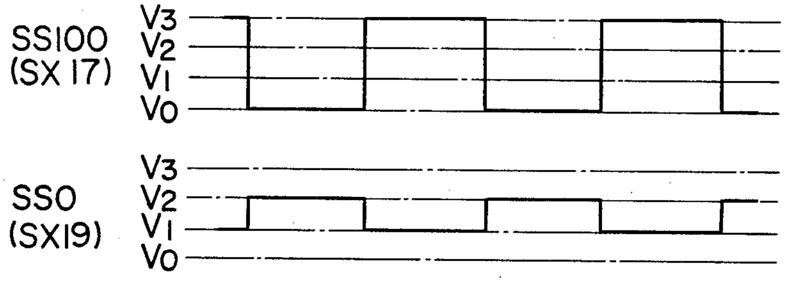
FIG. 5A is a waveform chart showing an example of the selection driving signal used in the invention.
Figure 5B:
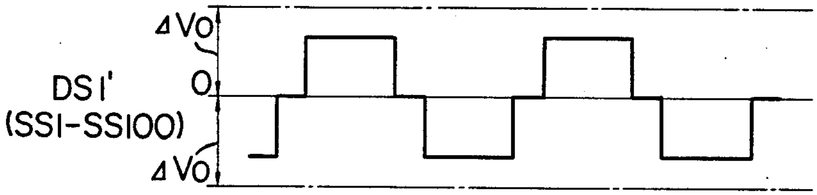
FIGS. 5B and 5C are waveform charts showing the waveforms of the signals at dots D (17, 1) and D (19, 1)
Figure 5C:
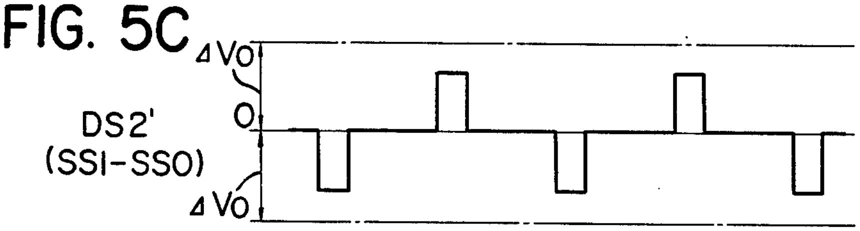

To the signal line SX1 in X1-row there is applied the selection driving signal SS1 shown in FIG. 2B to lighten only the dot D (1, 1). To the signal lines SX17 and SX19 in lines X17 and X19, however, there are supplied signals particularly formed by taking into consideration all possible signal waveforms. More concretely, signals SS100 and SS0 shown in FIG. 5A are supplied to the signal lines SX17 and SX19 respectively. As shown in FIG. 5A, the signal SS100 is of such waveform in which voltages V3 and V0 appear alternately. The signal SS0 is of such waveform in which voltages V1 and V2 appear alternately. When such particular signal SS100 is supplied to the display panel 3 in synchrony with the signal SS1 shown in FIG. 2B, the dot D (17, 1) has a signal waveform DS1' as shown in FIG. 5B. The signal waveform DS1' never reaches the lighting potential ΔVo and therefore the dot D (17, 1) can not light up in any case. Also, when the particular signal SS0 is supplied to the display panel 3 in synchrony with the signal SS1, the dot D (19, 1) has a signal waveform DS2' as shown in FIG. 5C. This signal waveform DS2' never reaches the lighting potential and therefore the dot D(19, 1) can not light up in any case. In this manner, any liquid crystal dot formed at an intersection at which two time division driving signal lines or two selection driving signal lines intersect each other with liquid crystal being sandwiched therebetween, never light up even when signals are supplied thereto.

As is readily understood from the foregoing, according to this invention, the number of liquid crystal dots which can be driven for display in a square liquid crystal display panel is increased to twice that in the prior art devices of the same driving duty. For example, as shown in the above embodiment, it is possible to form a square liquid crystal display panel composed of 8×8×2 dot matrix and drive it for display by a driver having a driving capacity of ¼ duty according to the invention.

What I claim is:

1. Apparatus for driving liquid crystal that defines a liquid crystal panel having two surfaces, said apparatus comprising:

a first signal line group arranged on one surface of said liquid crystal panel;

a second signal line group arranged on another surface of said liquid crystal panel and disposed in the direction which intersects the lines of said first group at right angles;

a third signal line group arranged between the lines of said first group;

a fourth signal line group arranged between the lines of said second group;

time division driving signal generating means for supplying time division driving signals to said first and fourth signal line groups; and selection driving signal generating means for supplying selection driving signals to said second and third signal line groups in synchronism with the time division driving signals generated by said time division driving signal generating means.

2. Apparatus as set forth in claim 1, which further comprises memory means for memorizing address data corresponding to the selection driving signals to be generated by said selection driving signal generating means.

3. Apparatus as set forth in claim 1, which further comprises a fifth signal line group for connecting said first signal line group to said fourth signal line group so as to supply to said first and fourth signal line groups the time division driving signals generated by said time division driving signal generating means.

4. Apparatus for driving liquid crystal that defines a liquid crystal panel having two surfaces, said apparatus comprising:

a first signal line group arranged on one surface of said liquid crystal panel;

a second signal line group arranged on another surface of said liquid crystal panel;

a third signal line group arranged on the same surface of said liquid crystal panel as is said first signal line group;

a fourth signal line group arranged on the same surface of said liquid crystal panel as is said second signal line group;

time division driving signal generating means for supplying time division driving signals to said first and fourth signal line groups; and selection driving signal generating means for supplying selection driving signals to said second and third signal line groups in synchronism with the time division driving signals generated by said time division driving signal generating means.

5. Apparatus as set forth in claim 4, which further comprises memory means for memorizing address data corresponding to the selection driving signals to be generated by said selection driving signal generating means.

* * * * *

UNITED STATES PATENT AND TRADEMARK OFFICE

CERTIFICATE OF CORRECTION

PATENT NO. : 4,447,131

DATED : May 8, 1984

INVENTOR(S) : TSUNENORI SOMA

It is certified that error appears in the above-identified patent and that said Letters Patent is hereby corrected as shown below:

Column 1, line 11, "diplay" should read --display--.

Column 2, line 1, "liner" should read --lines--;
line 10, "reffering" should read --referring--;
line 45, "can not" should read --cannot--.

Column 3, line 5, "On" should read --One--;
line 7, insert --dots-- between "between" and ".";
line 51, "consequently" should read --Consequently--;
line 53, delete "dots";
line 54, insert --dots-- between "of" and "larger".

Column 5, lines 15 - 16, after "connected" insert --to--;
line 17, insert --to-- between "connected" and "each";
line 19, insert --to-- between "connected" and "each";
line 46, "columuns" should read --columns--;
lines 55-56, "columuns" should read --columns--;
line 58, delete "in";
line 67, "s" should read --a--.

Column 6, line 30, "lighted on" should read --lit--.

Column 7, line 6, "shwon" should read --shown--;
line 13, insert a comma between "observed" and "the";
line 15, "can not" should read --cannot--;
line 31, "can not" should read --cannot--;
line 37, "crystad" should read --crystal--.

UNITED STATES PATENT AND TRADEMARK OFFICE
CERTIFICATE OF CORRECTION

PATENT NO. : 4,447,131

DATED : May 8, 1984

INVENTOR(S) : TSUNENORI SOMA

It is certified that error appears in the above-identified patent and that said Letters Patent is hereby corrected as shown below:

Column 8, line 3, "can" should read -- can- --;
line 9, "can not" should read --cannot--;
line 22, insert --an-- between "of" and "8".

Signed and Sealed this

*Fourth* Day of *December 1984*

[SEAL]

*Attest:*

GERALD J. MOSSINGHOFF

*Attesting Officer* *Commissioner of Patents and Trademarks*